United States Patent
Onishi et al.

(10) Patent No.: US 10,509,252 B2
(45) Date of Patent: Dec. 17, 2019

(54) POLYMER FILM, AND LIGHT DIFFUSION FILM COMPRISING SAME FOR DISPLAY

(71) Applicants: MITSUBISHI GAS CHEMICAL COMPANY, INC., Tokyo (JP); MGC FILSHEET CO., LTD., Saitama (JP)

(72) Inventors: Takeshi Onishi, Fukushima (JP); Masahide Takeda, Tokyo (JP); Shotaro Ohno, Tokyo (JP); Shohei Takahagi, Fukushima (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 13 days.

(21) Appl. No.: 15/577,038

(22) PCT Filed: Jun. 2, 2016

(86) PCT No.: PCT/JP2016/066322
§ 371 (c)(1),
(2) Date: Nov. 27, 2017

(87) PCT Pub. No.: WO2016/194990
PCT Pub. Date: Dec. 8, 2016

(65) Prior Publication Data
US 2018/0136510 A1    May 17, 2018

(30) Foreign Application Priority Data
Jun. 4, 2015 (JP) ................. 2015-114270

(51) Int. Cl.
| | |
|---|---|
| *G02F 1/1335* | (2006.01) |
| *F21V 3/00* | (2015.01) |
| *F21S 2/00* | (2016.01) |
| *F21V 3/04* | (2018.01) |
| *G02B 5/02* | (2006.01) |
| *B29C 48/30* | (2019.01) |
| *B29C 48/305* | (2019.01) |

(52) U.S. Cl.
CPC ........ *G02F 1/133504* (2013.01); *B29C 48/30* (2019.02); *B29C 48/305* (2019.02); *F21S 2/00* (2013.01); *F21V 3/00* (2013.01); *F21V 3/04* (2013.01); *G02B 5/02* (2013.01); *G02B 5/0205* (2013.01); *G02F 1/1335* (2013.01); *G02F 1/133606* (2013.01); *Y10T 428/10* (2015.01); *Y10T 428/1036* (2015.01)

(58) Field of Classification Search
CPC ......... G02F 1/133504; G02F 1/133606; G02F 1/1335; B29C 48/305; B29C 48/30; G02B 5/0205; G02B 5/02; F21S 2/00; F21V 3/00; F21V 3/04; Y10T 428/1036; Y10T 428/10
See application file for complete search history.

(56) References Cited

U.S. PATENT DOCUMENTS

| | | | |
|---|---|---|---|
| 2007/0031097 A1* | 2/2007 | Heikenfeld | G02B 26/02 385/129 |
| 2008/0151376 A1 | 6/2008 | Suzuki et al. | |
| 2010/0136287 A1* | 6/2010 | Kato | C08J 5/18 428/141 |
| 2010/0148136 A1* | 6/2010 | Kawagoshi | C08L 33/08 252/589 |
| 2012/0257410 A1* | 10/2012 | Yokota | G02B 5/0221 362/606 |
| 2016/0054473 A1 | 2/2016 | Kakinoki et al. | |

FOREIGN PATENT DOCUMENTS

| | | |
|---|---|---|
| CN | 101929655 A | 12/2010 |
| EP | 3358404 A1 | 8/2018 |
| JP | H04-202501 A | 7/1992 |
| JP | 2003-302506 A | 10/2003 |
| JP | 2004-177680 A | 6/2004 |
| JP | 2005-140890 A | 6/2005 |
| JP | 2011022565 A | 2/2011 |
| JP | 5640797 B2 | 12/2014 |
| WO | 2008/081953 A1 | 7/2008 |
| WO | 2011/074647 A1 | 6/2011 |
| WO | 2014/163067 A1 | 10/2014 |

OTHER PUBLICATIONS

International Search Report from Application No. PCT/JP2016/066322, dated Aug. 30, 2016.
International Preliminary Report on Patentability from Application No. PCT/JP2016/066322, dated Dec. 5, 2017.
European Search Report issued with respect to Application No. 16803424.7, dated Nov. 28, 2018.

* cited by examiner

*Primary Examiner* — Anthony J Frost
(74) *Attorney, Agent, or Firm* — Greenblum & Bernstein, P.L.C.

(57) ABSTRACT

Provided is a polymer film which can eliminate both moire and glitter and is suitable for use as a diffusion film. The above-mentioned problems are solved with a polymer film, a surface of which has an arithmetic average roughness Ra of 0.63-1.80 µm, a root mean square roughness Rq of 0.76-2.40 µm, and an average height Rc of roughness-curve elements of 2.45-7.20 µm.

9 Claims, No Drawings

POLYMER FILM, AND LIGHT DIFFUSION FILM COMPRISING SAME FOR DISPLAY

TECHNICAL FIELD

The present invention relates to a polymer film that can be used in the field of display and optical apparatus including liquid crystal display devices (LCD).

BACKGROUND ART

Conventionally, in a display element that displays numerals and letters or that performs surface emission or the like by using a point light source such as a light-emitting diode or a linear light source such as a fluorescent lamp or a cathode tube, a light diffuser film is used which scatters transmitting light as if the above-described point or linear light source is a surface light source.

In addition, improvement of uneven luminance and enhancement of luminance are also desired in terms of display performance in the above-described display element and also in a flat panel display (FPD).

A general backlight unit of a liquid crystal display is provided with a light guide plate that has light scattering dots printed on the back, a light source (cold cathode tube, etc.) disposed on one or both sides of said light guide plate, a lens film (prism sheet) layered on said light guide plate, and a light diffuser sheet disposed on top or on both top and bottom of said lens film as needed. The light diffuser sheet incorporated in such a backlight unit plays the roles of uniformly diffusing the light from the light guide plate to prevent the dots from being visible on the display screen and suppressing optical loss for uniformly emitting the diffused light to the liquid crystal panel surface.

Several technical problems, however, have been confirmed in using a light diffuser sheet in a liquid crystal panel. Major problems include a phenomenon called glare caused by occurrence of a luminance distribution resulting from the interference between the color filter and the uneven surface of the optical film of the image display device, and a moire phenomenon caused by the interference between the uneven luminance and the color filter. Thus, it is desirable to suppress occurrence of these phenomena.

As a measure for reducing the glare, an anti-glare film described in Prior art document 1 is known, with which glare caused by an uneven profile having a period of 10 to 50 μm is reduced. The haze value, however, is about 1%, which is inadequate in terms of diffusion performance for suppressing the moire phenomenon.

Meanwhile, Prior art document 2 describes a film having a diffusion property sufficient to eliminate the moire phenomenon, but the profile of the film has a small number of valley parts per unit area and thus uniformity of the brightness is insufficient to avoid occurrence of glare.

Hence, there has been no film that overcame glare and moire at the same time by conventional technique.

PRIOR ART DOCUMENTS

Patent Documents

Patent document 1: Japanese Patent No. 5640797 (specification)
Patent document 2: International Publication No. 2008/081953

SUMMARY OF INVENTION

Problem to be Solved by Invention

The objective of the present invention is to provide a polymer film that can eliminate moire and glare at the same time and that can favorably be used as a light diffuser film.

Solution to Problem

In order to solve the above-described problems, the present inventors have gone through extensive research. As a result, they found that a film having a specific surface structure can satisfy moire and glare preventing performance at the same time, thereby accomplishing the present invention.

Thus, the present invention is as follows.

[1] A polymer film, wherein the film surface has an arithmetic average roughness Ra of 0.63 μm to 1.80 μm, a root mean square roughness Rq of 0.76 μm to 2.40 μm and an mean height Rc of roughness curve element of 2.45 μm to 7.20 μm.

[2] The polymer film according to [1], wherein the number of valley parts is 2500 to 8000.

[3] The polymer film according to either one of [1] and [2], wherein the proportion of the number of valley parts having an area of 300 μm$^2$ or less is 75 to 90% of the total number of valley parts.

[4] The polymer film according to any one of [1] to [3], wherein the haze value is 43% or higher.

[5] The polymer film according to any one of [1] to [4], wherein the polymer film is formed of a thermoplastic resin.

[6] The polymer film according to [5], wherein the thermoplastic resin comprises a polycarbonate resin.

[7] The polymer film according to [5], wherein the viscosity-average molecular weight of the polycarbonate resin is 10,000 to 40,000.

[8] The polymer film according to any one of [1] to [7], comprising 0.01 to 10 parts by mass of translucent particles in 100 parts by mass of the polymer film.

[9] The polymer film according to any one of [1] to [8], wherein the thickness of the polymer film is 50 to 450 μm.

[10] The polymer film according to any one of [1] to [9], produced by a melt extrusion method.

[11] A light diffuser film for a display using the polymer film according to any one of [1] to [10].

Effects of Invention

A polymer film of the present invention has a diffusion property necessary as a light diffuser film to solve the moire phenomenon, and, at the same time, can realize very high brightness uniformity to suppress the glare phenomenon even when used with a high precision liquid crystal panel.

DESCRIPTION OF EMBODIMENTS

Hereinafter, the present invention will be described in more detail.

A polymer film of the present invention is, for example, an embossed resin film whose surface profile is obtained transferring a random uneven profile of a mold roll surface by melt transfer. The polymer film may be used as a single layer or may be layered with other functional film.

(Material of Polymer Film)

A resin used as a material for the polymer film of the present invention is a thermoplastic resin, whose viscosity-average molecular weight is 10,000 to 40,000. The viscosity-average molecular weight of the thermoplastic resin is preferably 14,000 to 40,000 and more preferably 14,000 to 32,000.

Specific examples of the above-described thermoplastic resin for forming the polymer film include, but not specifically limited to: polyesters such as polycarbonate, polyarylate, polysulfone, PET and polyethylene naphthalate; cellulose-based polymers such as polyethersulfone and polyvinyl alcohol; polyolefins such as polyethylene and polypropylene; polystyrene, polymethyl methacrylate, polyvinyl chloride, polyvinylidene chloride, polyamide and norbornene-based polymers.

Among them, polycarbonate is particularly favorably used since it has the properties of high impact resistance, high light transmittance and a high refractive index.

As polycarbonate, for example, pellets of Iupilon (trademark) from Mitsubishi Engineering-Plastics Corporation, Calibre (trademark) from Sumika Styron Polycarbonate Limited, Panlite (trademark) from Teijin Limited, Tarflon (trademark) from Idemitsu Kosan Co., Ltd., and else are commercially available.

(Translucent Particles)

The above-described thermoplastic resin may contain translucent particles.

The average primary particle size of the translucent particles is 0.5 to 10 μm, more preferably 0.7 to 8 μm and particularly preferably 1 to 5 μm. This is because if the average primary particle size is within this range, a light diffusion property can be enhanced without deteriorating the strength of the resin and the glare.

The refractive index of the translucent particles is 1.35 to 1.65 and preferably 1.40 to 1.50.

The translucent particles used may be inorganic particles or organic particles.

Examples of the inorganic particles include silica and alumina, for example, spherical silica and spherical alumina from Micron Company.

Examples of the organic particles include particles formed of an acrylic styrene resin, a polymethyl methacrylate resin, a silicon-based resin, a polystyrene-based resin, a benzoguanamine-based resin, a melamine-based resin, a polyolefin-based resin, a polyester-based resin, a polyamide-based resin, a polyimide-based resin and a polyfluoroethylene-based resin.

Examples of the styrene and acrylic resins include Chemisnow MX (trademark) and SX (trademark) series from Soken Chemical and Engineering Co., Ltd. and Techpolymer (trademark) from Sekisui Plastics Co. Ltd.; examples of the benzoguanamine-based resin include Epostar (trademark) from Nippon Shokubai Co., Ltd.; and examples of the melamine-based resin include Optbeads (trademark) from Nissan Chemical Industries Ltd. These can easily be obtained as commercial products.

More preferably, organic particles whose expansion coefficient characteristics is similar to that of the thermoplastic resin is used from the standpoint of adhesion with the thermoplastic resin in the light diffuser film and from the standpoint of preventing interface separation and falling off caused by humidity or heat. According to the present invention, for example, organic particles whose linear expansion coefficient value is in a range of 2.0 to 9.0 ($\times 10^{-5}$/K) are used among others, from the standpoint of the expansion coefficient characteristics. More specifically, acrylic resin particles whose linear expansion coefficient value is in a range of 5.0 to 9.0 ($\times 10^{-5}$/K) or silicon resin particles whose linear expansion coefficient value is in a range of 2.0 to 3.0 ($\times 10^{-5}$/K) may be used. Among these particles, particles formed of an acrylic resin whose linear expansion coefficient value is in a range of about 7 ($\times 10^{-5}$/K) which is similar to that of a polycarbonate resin are particularly preferably used.

According to the present invention, the absolute value of the difference in the refractive index between the translucent particles and the above-described thermoplastic resin (the part other than the translucent particles in the light diffuser film) is 0.06 to 0.24 and preferably 0.09 to 0.19. This is because as long as the difference in the refractive index between the translucent particles and the thermoplastic resin is within the above-mentioned range, optical loss due to excessive scattering can be suppressed and deterioration of luminance can be minimized to realize a good diffusion property.

The above-described translucent particles are preferably used in an amount of 0.01 to 10 parts by mass, more preferably 0.01 to 5 parts by mass, particularly preferably 0.05 parts by mass or more and less than 3 parts by mass, with respect to 100 parts by mass of the polymer film. By controlling the amount of the particles to lie within this range, the surface scattering and the inner scattering can appropriately be controlled.

(Optical Properties of Polymer Film)

The polymer film of the present invention is preferably excellent in light transmittance and light diffusion property.

Specifically, the light transmittance of the polymer film of the present invention is preferably 80% or higher and more preferably 85% or higher from the standpoint of transparency. In addition, the haze value of the polymer film is preferably 43% or higher and more preferably 45% or higher from the standpoint of a moire reduction effect.

(Surface Profile of Polymer Film)

The surface profile of the polymer film is determined by the shape and the roughness of the pattern to be formed.

The profile of the pattern to be formed is preferably random and uneven from the standpoint of preventing moire.

Furthermore, the roughness of the pattern to be shaped for the polymer film of the present invention is defined by the surface roughness (Ra: arithmetic average roughness, Rq: root mean square roughness and Rc: mean height of roughness curve element) and the number of valley parts or the area frequency distribution of the valley parts of the film.

The surface roughness of the polymer film of the present invention satisfies the following relationship.

(1) Ra is 0.63 μm to 1.80 μm, preferably 0.65 μm to 1.60 μm and particularly preferably 0.70 μm to 1.45 μm (2) Rq is 0.76 μm to 2.40 μm, preferably 0.80 μm to 2.20 μm and particularly preferably 0.85 μm to 1.80 μm (3) Rc is 2.45 μm to 7.20 μm, preferably 2.50 μm to 6.00 μm and particularly preferably 2.70 μm to 6.00 μm If these values, i.e., (1) Ra, (2) Rq and (3) Rc, are too small, the uneven brightness generated by the prism film in the liquid crystal display cannot be diffused sufficiently to eliminate the moire phenomenon, and the scratch resistance is deteriorated such that a scratch that lowers the yield of the polymer film is generated during the production process, which are unfavorable. On the other hand, if the above-described value is too large, the surface profile of the film becomes rough, by which the light transmitted to the light emitting face becomes irregular and the unevenness of brightness becomes large, which may cause a glare phenomenon.

In general, the surface profile of the polymer film can also be defined by the values of the mean spacing of irregularities (Sm) and the mean spacing of local peaks (S). According to the present invention, however, defining the surface profile based on these parameters, i.e., Sm and S, is not considered to be advantageous. This is because in a polymer film having the values such as Ra in the predetermined ranges as described above, it is particularly difficult to appropriately measure the value Sm and thus difficult to reduce glare by adjusting the values Sm and S of the polymer film.

The above-mentioned "(1) Ra: arithmetic average roughness" is defined as follows. Specifically, an arithmetic average roughness (Ra) is a value (unit: μm) derived from the following Equation (1) where a roughness curve is expressed as Y=Z(X) based on the roughness curve of the surface of the polymer film, taking X-axis to the mean line direction and Y-axis to the vertical magnification direction (direction vertical to the mean line) with respect to a reference length in the mean line direction. Five values were determined for each reference length and the average value thereof was considered to represent the measured value at one position. Measured values were determined at five different positions and averaged to be shown in Table 1.

[Numerical formula 1]

$$Ra = \frac{1}{l} \int_o^l |Z(x)| dx \quad \text{Equation (1)}$$

The above-mentioned "(2) Rq: root mean square roughness" is defined as follows. Specifically, first, for the above-described reference length, the root mean square of Z (X) were determined for five segments for each reference length according to Equation (2) below and averaged. Moreover, this calculation was repeated for five times at different positions to obtain the averaged value thereof (unit: μm) as the root mean square roughness (Rq).

[Numerical formula 2]

$$Rq = \sqrt{\frac{1}{l} \int_o^l Z^2(x) dx} \quad \text{Equation (2)}$$

Furthermore, The above-mentioned "(3) Rc: mean height of roughness curve element" is defined as follows. Specifically, first, for the above-described reference length, mean heights Zt of the profile curve element were determined for five segments for each reference length according to the following equation and averaged. This calculation was repeated for five times at different positions to obtain the averaged value thereof (unit: μm) as the mean height of the roughness curve element (Rc).

[Numerical formula 3]

$$Rc = \frac{1}{m} \sum_{i=1}^{m} Zti \quad \text{Equation (3)}$$

The definition of the above-mentioned profile curve element is as follows.

Profile curve element: a set of neighboring peak and valley

Minimum height and minimum length for identifying peaks (valley part):

Identification of minimum height: 10% of Rz
Identification of minimum length: 1% of reference length The number of valley parts or the area frequency distribution of the valley parts satisfies the following relationships.

Specifically, in a polymer film of the present invention:

(4) The number of the valley parts described in detail below is 2500 to 8000, preferably 3000 to 7000 and particularly preferably 4000 to 6000.

(5) The area frequency distribution of the valley parts is defined by the proportion of the number of valley parts having an area of 300 $\mu m^2$ or less to the total number of the valley parts, where the proportion of the number of valley parts having an area of 300 $\mu m^2$ or less is 75 to 90% and preferably 80 to 88%.

A valley part of a polymer film refers to recessed parts of the polymer film having an uneven profile.

More specifically, a valley part is identified as continuous sets of unit regions defined by the measurement method described in the example below. Specifically, a measurement image within a predetermined are (an image of an area having a horizontal length of 2457.6 μm and a vertical length of 1843.2 μm of the surface of the actual polymer film: hereinafter, referred to as a reference image) is fractionated into smaller unit regions (i.e., divided into 640 horizontal pixels and 480 vertical pixels, where the area of each unit region is 3.84×3.84 ($\mu m^2$/pixel)), and black portions having a monochrome density value less than a certain threshold in these unit regions based on the density criteria are defined as the valleys.

The threshold of the monochrome density value used as the above-described criteria for brightness is as follows. Specifically, the monochrome density value was altered to find out a value that gave a number of unit regions identified as the valleys to be 20% of the total number in the entire unit region and the value was set as the threshold used as the density criteria. Then, black unit regions having a monochrome density value less than the set threshold were identified as valleys.

Furthermore, a region (aggregate) having more than one continuous unit regions identified as the valleys was defined as a valley part. Specifically, a valley part refer to a region of aggregated valleys that is surrounded by unit regions that are not identified as the valleys (projected regions). A plurality of valleys that are not completely continuous and interrupted by a projected region were considered as a plurality of independent valley parts even if the region was visually recognized as a single valley part in the reference image.

In this manner, the number and the area of the valley parts defined in a reference image were determined. The resulting count of the valley parts was defined as the number of valley parts per area of the above-described reference image.

Based on the thus-defined number and area of valley parts per area of the reference image, the area frequency distribution of the valley parts was defined as "a proportion of the number of valley parts having an area of 300 $\mu m^2$ or less to the total number of valley parts".

The area frequency distribution of the valley part is a parameter that represents how much the valley parts are aggregated (continuous) in the reference image, showing whether the valley parts are finely dispersed or roughly located.

Specifically, if the number of aggregated (continuous) valleys is large in the reference image, the number of valley parts having an area of 300 $\mu m^2$ or less is small due to the presence of a small number of valley parts having large areas and the value of the area frequency distribution (%) of the valley parts is low. On the other hand, if the number of aggregated (continuous) valleys is small in the reference image, in other words, if a large number of valleys are dispersed and thus a large number of valley parts having small areas are present, the number of valley parts having an area of 300 μm$^2$ or less is large and the value of the area frequency distribution (%) of the valley parts is high.

A polymer film of the present invention having roughness of the shaped pattern on the film surface adjusted as described above can be used to prevent both moire and glare in the light diffuser film that have conventionally been difficult. In particular, since not only the degree of the roughness (unevenness) of the shaped pattern on the film surface can be defined but also the number or the area frequency distribution of valley parts can be adjusted to lie within an suitable range, the extent of the unevenness distribution, that is, how much the valley parts (recessed parts) are concentrated in the reference region can also be defined. Therefore, the effect of preventing moire and glare can further be enhanced. Since high precision 4K panels having a large number of small picture elements (whose horizontal picture elements is about 4000) did not exist conventionally, glare of the light diffuser film has not been recognized as a large problem and thus examination of the pattern (unevenness) of the film surface has not been focused.

(Thickness of Polymer Film)

The thickness of the polymer film is 50 to 450 μm, preferably 60 to 300 μm and more preferably 70 to 200 μm. A polymer film having the thickness within the above-described range has good balance between film moldability and surface profile shapability, is excellent in productivity, and is favorable as an optical member having suitable rigidity. In addition, this polymer film can be used by layering with other functional film.

(Mold Roll)

A mold roll used for producing a film of the present invention is, for example, an embossing roll having a surface structure with a random uneven profile.

As a specific exemplary method for producing a mold roll, a soft copper-plated roll surface can be shaped to have a predetermined profile by sandblast, which is then subjected to hard chromium plating so as to have a predetermined surface roughness, for example, a ten-point average roughness of 6.00 μm to 10.0 μm.

Sandblast processing may be ordered to a roll processing manufacturer, or the roll may easily be made by own by considering the conditions of the blast device.

(Method for Forming Surface Profile of Polymer Film and Method for Producing Polymer Film)

A resin film (polymer film) of the present invention can be molded with a general melt extrusion molding device, for example, as follows. Specifically, a molten resin film melted in an extruder and comes out from a T-die is nipped between a first rubber elastic cooling roll and a second metal cooling roll having an embossed surface to shape uneven profile onto the film surface, which is taken up by a third metal cooling roll and a take-up roll arranged downstream, thereby producing a resin film.

Here, a method for forming a specific surface profile having a number of valley parts and an area frequency distribution of valley parts defined as described above (for example, a surface profile having a number of valley parts of 2,500 to 8,000 and a proportion of the number of valley parts having an area of 300 μm$^2$ or less of 75 to 90% to the total number of valley parts) can be realized by appropriately adjusting the conditions for producing a polymer film such as the above-described surface profile of the cooling roll and else.

EXAMPLES

Hereinafter, the present invention will be described more specifically by way of examples. The present invention, however, should not be limited to the following examples, and may be modified and carried out in any way without departing from the spirit of the present invention.

<(1) Method for Measuring Film Surface Roughness (Ra, Rq, Re)>

(Measurement Instrument)

CNC hybrid surface property measuring device Formtracer Extreme CS-H5000 CNC (Mitutoyo)

Measurement was carried out according to the measurement conditions of JIS B0601-2001.

Evaluated length: 4.0 mm
Reference length: 0.8 mm
Number of sections: 5 sections
Cutoff values λc: 0.8 mm, λs: 0.0025 mm
Scanning rate: 0.2 mm/s
Automatic leveling: effective
(Sample)
50 mm×50 mm square film
(Calculation Method)

Results obtained from measuring roughness at five positions in the same sample film were averaged and shown in the table.

<Methods for Determining Number and Area Frequency Distribution of Valley Parts>

Measurement of this value consists of: (1) acquirement of reference image; and (2) measurement of image.

(1) Acquirement of reference image (Instruments Used)

Microscope: Industrial Microscope SCLIPSE LV100D (Nikon)

Imaging software: NIS-Elements D2.30 (Nikon)

(Setting Conditions of Microscope)

Lighting device: LV-UEPI
Lamp house: LV-LH50PC (12V, 50A)
Imaging camera: DIGITAL Sight DS-Fil
Lenses: eyepiece (×10), object lens (×5)
EPI/DIA selector switch: EPI (vertical illumination) mode
Aperture diaphragm F stop: MAX
Aperture diaphragm A stop: MAX
ND filter: None
Light control dial: 4V
(Measurement Conditions of NIS-Elements)
Observation mode: RGB mode
Calibration: ×5 (magnification of object lens) CCD read-out mode: standard
Captured image size: 640 horizontal pixels×480 vertical pixels (unit region: 3.84×3.84 μm$^2$/pixel)
Exposure: manual exposure
Exposure time: 100 ms
AE-lock: no checking
Gain: 1.40×
Contrast: standard
(Setting of command buttons)
ROI: No setting
(Advanced Setting)
Measurement settings: mode average
Image quality: No noise suppression
No sharpness
Offset 0.00

Saturation 0.00
Hue 0.00
Preset: standard
White balance: Red 0.85, Green 1.00, Blue 3.75
(Preparation of Sample)
Oil having the same refractive index as the base material of the sample film was applied to the 50 mm×50 mm square film on the surface opposite from the surface having the uneven profile, and a mirror finished film made from the same material as the sample film was closely attached for invalidating the influence caused by the unevenness on the opposite side.
(Photographing Method)
Step 1. The prepared sample described above were secured at the four sides on the stage of the microscope with tape.
Step 2. An image of a region of 2457.6 µm (horizontal)× 1843.2 µm (vertical) on the surface of the actual sample film was brought into focus and captured as a clear image file of 640 horizontal pixels×480 vertical pixels (a side of 3.84 µm/pixel) (reference image: jpg file).
Step 3. Images were acquired at two different places on the same sample film.
(2) Measurement of image (software used)
Image analysis/measurement software WinROOF2013 (Mitani Corporation)
(Measurement conditions of WinROOF2013)
Execution of monochrome imaging
Background elimination setting: 1250 µm
(2-1) Method of Counting Valley Parts
The image acquired in the above-described image acquiring step was subjected to measurement by using image analysis/measurement software WinROOF2013 according to the following steps.
Step 1. Open the image file to be analyzed.
Step 2. Convert the image into a monochrome image.
Step 3. Background elimination: 1250 µm
Step 4. Threshold setting and binarization:
A threshold for brightness was set such that the area of the dark picture elements in the above-described reference image was between 19 to 21% and nearest to 20% of the total area of the reference image. Then, binarization was conducted based on the threshold to distinguish "a part targeted for measurement" and the rest of the "part that is not targeted", where black picture elements having monochrome density values lower than the threshold were targeted for measurement as a valley part. The permeability was set to 123.
Step 5. Click the area/total count determination button to determine the number of the targeted dark picture elements.
Step 6. Two images acquired at different places of the same sample were measured and the results thereof were averaged and shown in the table.
(2-2) Method of Determining Area Frequency Distribution
The proportion (%) of the valley parts having an area of 300 µm² or less in the image acquired in the above-described imaging step of the method of counting the valley parts was determined by using image analysis/measurement software WinROOF2013 according to the following steps.
Step 1. Open the file.
Step 2. Convert the image into a monochrome image.
Step 3. Background elimination: 1250 µm
Step 4. Threshold setting and binarization:
A threshold for density was set such that the area of the dark picture elements in the above-described reference image was between 19 to 21% and nearest to 20% of the total area of the reference image. Then, binarization was conducted based on the threshold to distinguish "a part targeted for measurement" and the rest of the "part that is not targeted", where black picture elements having monochrome density values lower than the threshold were targeted for measurement as a valley part. The permeability was set to 123.
Step 5. Click the shape characteristics button to put a checkmark of the area to measure the area of each region (valley part) having the above-described continuous black picture elements that were targeted for measurement.
Step 6. A frequency distribution was generated from the values of the measured areas to calculate the proportion of the number of valley parts having an area of 300 µm² or less to the total number of the valley parts.
Step 7. Two images acquired at different places of the same sample were measured and the results thereof were averaged and shown in the table.
<Measurement of Haze Value>
(Instruments Used)
Haze meter HM-150 (Murakami Color Research Laboratory Co., Ltd.)
(Preparation of Sample)
Oil having the same refractive index as the base material of the film was applied to the back of a 50 mm×50 mm square film, and a mirror finished film made from the same material as the mirror finished sample film was closely attached for invalidating the influence caused by the unevenness on the back.
(Measurement Step)
The above-described sample was set in the haze meter such that the uneven profile side of the film was on the detector side and the mirror finished side was on the light source side, thereby measuring the haze value.
<Method for Evaluating Scratch Resistance>
(Instruments Used)
Plane abrasion tester PA-300A (from Daiei Kagaku Seiki MFG. co., ltd.)
(Measurement Conditions)
Number of reciprocation of jig: 10 times
Upper crimping jig: 20 mm×20 mm square
(Preparation of Sample)
Upper film cut into a size of 30 mm×30 mm with the edge parts rounded with sandpaper.
Lower film cut into a size of 50 mm×200 mm.
(Operation Procedure)
The upper film and the lower film were layered such that the uneven profile surfaces make contact, and the resultant was subjected to an abrasion test with a load of 500 g to judge the presence of scratch.
(Evaluation)
Poor when one or more scratch occurred.
Good when no scratch occurred.
<Method for Evaluating Moire>
(Instruments Used)
Commercially available liquid crystal television UA55HU6000 (from SAMSUNG)
(Preparation of Sample)
Two sample films cut into A4 size were layered such that the uneven profile surfaces faced outside while oil having the same refractive index as the base material was applied inside to closely attach the sample films for invalidating the optical influence caused by the uneven profile on the opposite sides, thereby accurately evaluating the property of the uneven profile of the surface.

(Measurement Steps)

Step 1. The diffusion film was removed from a 4K television used for evaluation and the sample was inserted to replace the original diffusion film Step 2. The television incorporating the developed product was assembled, and the screen background was set to green monochrome light.

Step 3. By visual observation from a position 30 cm away, the degree of moire was rated in three grades, i.e., excellent, good and poor, by sensory evaluation.

(Evaluation)

Poor when a stripe pattern due to moire phenomenon was clear

Good when a stripe pattern due to moire phenomenon was slightly present but unclear Excellent when a stripe pattern due to moire phenomenon was hardly visible <Method for Evaluating Glare>

(Instruments Used)

Commercially available liquid crystal television UA55HU6000 (from SAMSUNG)

(Preparation of Sample)

Two sample films cut into A4 size were layered such that the uneven profile surfaces faced outside while oil having the same refractive index as the base material was applied inside to closely attach the sample films for invalidating the optical influence caused by the uneven profile on the opposite sides, thereby accurately evaluating the property of the uneven profile of the surface.

(Measurement Steps)

Step 1. The diffusion film was removed from a 4K television used for evaluation and the sample was inserted to replace the original diffusion film.

Step 2. The television incorporating the developed product was assembled, and the screen background was set to green monochrome light.

Step 3. By visual observation from a position 30 cm away, the degree of glare was rated in two grades, i.e., good and poor, by sensory evaluation.

(Evaluation)

Poor when roughness due to glare phenomenon was clear

Good when roughness due to glare phenomenon was not visible.

Comparative Example 1

Pellets of a polycarbonate resin (Iupilon E-2000 from Mitsubishi Engineering-Plastics Corporation) were dried with a hot air drier at 120° C. for 3 hours. These pellets were melt-extruded with a 90-mm single-screw extruder and a T-die at 270° C., and the extruded molten film was nipped between a first silicon rubber cooling roll with a diameter of 220 mm and a second embossed metal cooling roll with a diameter of 450 mm that had a surface with a ten-point average roughness of 16 μm. Thus, the film surface was shaped with the embossed pattern and cooled, and the film was further passed though a third metal cooling roll with a mirror finished surface to mold a one-side embossed film with a thickness of 130 μm while taking up with a take-up roll. During the procedure, the temperature of the first cooling roll was set to 50° C., the temperature of the second cooling roll was set to 130° C. and the temperature of the third cooling roll was set to 130° C., with the speed of the cooling rolls being 9.9 m/min. The results from evaluating the properties of the resulting film are shown in Table 1.

Example 1

Pellets of a polycarbonate resin (Iupilon E-2000 from Mitsubishi Engineering-Plastics Corporation) were dried with a hot air drier at 120° C. for 3 hours. These pellets were melt-extruded with a 90-mm single-screw extruder and a T-die at 280° C. and the extruded molten film was nipped between a first silicon rubber cooling roll with a diameter of 220 mm and a second embossed metal cooling roll with a diameter of 450 mm that had a surface with a ten-point average roughness of 7.5 μm. Thus, the film surface was shaped with the embossed pattern and cooled, and the film was further passed though a third metal cooling roll with a mirror finished surface to mold a one-side embossed film with a thickness of 130 μm while taking up with a take-up roll. During the procedure, the temperature of the first cooling roll was set to 50° C., the temperature of the second cooling roll was set to 130° C. and the temperature of the third cooling roll was set to 130° C., with the speed of the cooling rolls being 9.0 m/min. The results from evaluating the properties of the resulting film are shown in Table 1.

Example 2

Pellets of a polycarbonate resin (Iupilon S-3000 from Mitsubishi Engineering-Plastics Corporation) were dried with a hot air drier at 120° C. for 3 hours. These pellets were melt-extruded with a 90-mm single-screw extruder and a T-die at 300° C. and the extruded molten film was nipped between a first silicon rubber cooling roll with a diameter of 220 mm and a second embossed metal cooling roll with a diameter of 450 mm that had a surface with a ten-point average roughness of 8.3 μm. Thus, the film surface was shaped with the embossed pattern and cooled, and the film was further passed though a third metal cooling roll with a mirror finished surface to mold a one-side embossed film with a thickness of 130 μm while taking up with a take-up roll. During the procedure, the temperature of the first cooling roll was set to 60° C., the temperature of the second cooling roll was set to 135° C. and the temperature of the third cooling roll was set to 135° C., with the speed of the cooling rolls being 11.5 m/min. The results from evaluating the properties of the resulting film are shown in Table 1.

Example 3

Pellets of a polycarbonate resin (Iupilon E-2000 from Mitsubishi Engineering-Plastics Corporation) were dried with a hot air drier at 120° C. for 3 hours. These pellets were melt-extruded with a 90-mm single-screw extruder and a T-die at 280° C., and the extruded molten film was nipped between a first silicon rubber cooling roll with a diameter of 220 mm and a second embossed metal cooling roll with a diameter of 450 mm that had a surface with a ten-point average roughness of 7.7 μm. Thus, the film surface was shaped with the embossed pattern and cooled, and the film was further passed though a third metal cooling roll with a mirror finished surface to mold a one-side embossed film with a thickness of 175 μm while taking up with a take-up roll. During the procedure, the temperature of the first cooling roll was set to 60° C., the temperature of the second cooling roll was set to 135° C. and the temperature of the third cooling roll was set to 135° C., with the speed of the cooling rolls being 9.0 m/min. The results from evaluating the properties of the resulting film are shown in Table 1.

Example 4

Pellets prepared by adding 0.1 parts by mass of silicone particles (SL-200M from SAMSUNG) to 100 parts by mass of a polycarbonate resin (Iupilon S-3000 from Mitsubishi Engineering-Plastics Corporation) were dried with a hot air drier at 120° C. for 3 hours. These pellets were melt-extruded with a 90-mm single-screw extruder and a T-die at 280° C. and the extruded molten film was nipped between a first silicon rubber cooling roll with a diameter of 220 mm and a second embossed metal cooling roll with a diameter of 450 mm that had a surface with a ten-point average roughness of 7.7 μm. Thus, the film surface was shaped with the embossed pattern and cooled, and the film was further passed though a third metal cooling roll with a mirror finished surface to mold a one-side embossed film with a thickness of 175 μm while taking up with a take-up roll. During the procedure, the temperature of the first cooling roll was set to 60° C., the temperature of the second cooling roll was set to 135° C. and the temperature of the third cooling roll was set to 135° C., with the speed of the cooling rolls being 11.5m/min. The results from evaluating the properties of the resulting film are shown in Table 1.

Comparative Example 2

Pellets of a polycarbonate resin (Iupilon S-3000 from Mitsubishi Engineering-Plastics Corporation) were dried with a hot air drier at 120° C. for 3 hours. These pellets were melt-extruded with a 90-mm single-screw extruder and a T-die at 280° C. and the extruded molten film was nipped between a first silicon rubber cooling roll with a diameter of 220 mm and a second embossed metal cooling roll with a diameter of 450 mm that had a surface with an arithmetic average roughness of 0.84 μm. Thus, the film surface was shaped with the embossed pattern and cooled, and the film was further passed though a third metal cooling roll with a mirror finished surface to mold a one-side embossed film with a thickness of 75 μm while taking up with a take-up roll. During the procedure, the temperature of the first cooling roll was set to 50° C., the temperature of the second cooling roll was set to 130° C. and the temperature of the third cooling roll was set to 130° C., with the speed of the cooling rolls being 16.7 in/min. The results from evaluating the properties of the resulting film are shown in Table 1. According to luminance measurement, luminance was not significantly enhanced by mounting the polycarbonate resin film of this comparative example.

As can be appreciated from Table 1, polymer films with excellent performance such as a moire preventing property and a glare preventing property were realized in Examples 1 to 4 in which the value of arithmetic average roughness Ra was adjusted to 0.63 μm to 1.80 μm, the value of root mean square roughness Rq was adjusted to 0.76 μm to 2.40 μm and the value of mean height of roughness curve element Rc was adjusted to 2.45 μm to 7.20 μm.

On the other hand, the glare preventing property was confirmed to be inferior in Comparative Example 1 in which each of the values related to surface roughness was higher and a number (counts) of valley parts was small. This seem to result from the rough surface profile of the film, due to which the light transmitted through the light emitting face was not uniform.

In addition, the moire preventing property and the scratch resistance were confirmed to be inferior in Comparative Example 2 in which each of the values related to surface roughness was lower and a number (counts) of valley parts was large. This seem to result from the small unevenness of the film surface, due to which diffusion of the brightness unevenness was insufficient, and a foreign substance on the film surface moved easily and scratched the surface.

In addition, from the results obtained in the examples and the comparative examples, adjusting the number of valley parts to lie within a range of 2500 to 8000 and the proportion of the number of valley parts having a predetermined small area (300 μm$^2$ or less) to lie within a range of 75 to 90% was also confirmed to be beneficial.

The invention claimed is:
1. A polymer film, wherein the film surface has an arithmetic average roughness Ra of 0.63 μm to 1.80 μm, a root mean square roughness Rq of 0.76 μm to 2.40 μm and a mean height Rc of the roughness curve element of 2.45 μm to 7.20 μm,
  wherein the number of valley parts of the polymer film is 2500 to 8000, and the valley part refers to recessed parts of the polymer film having an uneven profile,
  with the proviso that when an image of an area having a horizontal length of 2457.6 μm and a vertical length of 1843.2 μm of the surface of the polymer film is fractionated into smaller unit regions of 3.84×3.84 (μm$^2$/pixel), the black portions in the image having a monochrome density value less than a threshold in these unit regions based on the density criteria are defined as the valleys,

TABLE 1

|  | Comparative Example 1 | Example 1 | Example 2 | Example 3 | Example 4 | Comparative Example 2 |
|---|---|---|---|---|---|---|
| Ra (μm) | 1.81 | 1.4 | 0.83 | 0.77 | 0.85 | 0.61 |
| Rq (μm) | 2.42 | 1.79 | 1.05 | 0.97 | 1.07 | 0.75 |
| Rc (μm) | 7.35 | 5.54 | 3.25 | 3.02 | 3.32 | 2.43 |
| Haze (%) | 55 | 46 | 48 | 50 | 64 | 41 |
| Number of valley parts (counts) | 2226 | 4533 | 5253 | 5317 | 5551 | 8443 |
| Proportion of valley parts with area of 0-300 μm$^2$ | 73 | 82 | 84 | 84 | 86 | 92 |
| Scratch resistance | Good | Good | Good | Good | Good | Poor |
| Moire preventing property | Good | Good | Good | Good | Excellent | Poor |
| Glare preventing property | Poor | Good | Good | Good | Good | Good | said threshold being set such that the number of unit regions identified as valleys are 20% of the total number in the entire unit region of the image, and the valley part refers to a region of aggregated valleys that is surrounded by unit regions that are not identified as the valley;

wherein the number of valley parts counted in the image is defined as the number of valley parts, and wherein the proportion of the number of valley parts having an area of 300 $\mu m^2$ or less is 75 to 90% of the total number of valley parts.

2. The polymer film according to claim 1, wherein the haze value is 43% or higher.

3. The polymer film according to claim 1, wherein the polymer film is formed of a thermoplastic resin.

4. The polymer film according to claim 3, wherein the thermoplastic resin comprises a polycarbonate resin.

5. The polymer film according to claim 3, wherein the viscosity-average molecular weight of the thermoplastic resin is 10,000 to 40,000.

6. The polymer film according to claim 1, comprising 0.01 to 10 parts by mass of translucent particles in 100 parts by mass of the polymer film.

7. The polymer film according to claim 1, wherein the thickness of the polymer film is 50 to 450 µm.

8. The polymer film according to claim 1, produced by a melt extrusion method.

9. A light diffuser film for a display using the polymer film according to claim 1.

* * * * *